US012210968B2

(12) United States Patent
Kumar et al.

(10) Patent No.: US 12,210,968 B2
(45) Date of Patent: *Jan. 28, 2025

(54) TECHNOLOGY FOR ANALYZING SENSOR DATA TO DETECT CONFIGURATIONS OF VEHICLE OPERATION

(71) Applicant: QUANATA, LLC, San Francisco, CA (US)

(72) Inventors: Vinay Kumar, Fremont, CA (US); Kenneth J. Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 748 days.

This patent is subject to a terminal disclaimer.

(21) Appl. No.: 17/371,721

(22) Filed: Jul. 9, 2021

(65) Prior Publication Data

US 2021/0334660 A1    Oct. 28, 2021

Related U.S. Application Data

(63) Continuation of application No. 15/656,883, filed on Jul. 21, 2017, now Pat. No. 11,087,209.

(51) Int. Cl.
*G06N 3/08* (2023.01)
*G07C 5/00* (2006.01)
*G07C 5/08* (2006.01)

(52) U.S. Cl.
CPC .............. *G06N 3/08* (2013.01); *G07C 5/008* (2013.01); *G07C 5/0858* (2013.01)

(58) Field of Classification Search
None
See application file for complete search history.

(56) References Cited

U.S. PATENT DOCUMENTS

| 8,290,480 | B2 | 10/2012 | Abramson et al. |
| 8,731,530 | B1 | 5/2014 | Breed et al. |
| 9,888,392 | B1 | 2/2018 | Snyder et al. |
| 11,087,209 | B1* | 8/2021 | Kumar ................. G07C 5/0858 |
| 2011/0281564 | A1 | 11/2011 | Armitage et al. |
| 2016/0039429 | A1 | 2/2016 | Abou-Nasr et al. |
| 2017/0142556 | A1 | 5/2017 | Matus |
| 2018/0300629 | A1 | 10/2018 | Kharaghani et al. |

OTHER PUBLICATIONS

Bo et al. ("You're Driving and Texting: Detecting Drivers Using Personal Smart Phones by Leveraging Inertial Sensors"). (Year:2013).

* cited by examiner

*Primary Examiner* — Daniel T Pellett
(74) *Attorney, Agent, or Firm* — BRYAN CAVE LEIGHTON PAISNER LLP (57) ABSTRACT

Systems and methods for using collecting and analyzing device sensor data to determine whether an individual is an operator or a passenger of a vehicle are disclosed. According to certain aspects, an electronic device associated with the individual may collect or access sensor data that is indicative of or associated with an operation of the vehicle. The electronic device may transmit pertinent portion(s) of the sensor data to a backend server, which may input the portion(s) into a neural network for analysis. The neural network may output a probability metric(s) indicative of whether the individual is a passenger or an operator of the vehicle.

20 Claims, 6 Drawing Sheets

TECHNOLOGY FOR ANALYZING SENSOR DATA TO DETECT CONFIGURATIONS OF VEHICLE OPERATION

CROSS-REFERENCE TO RELATED APPLICATIONS

This application is a continuation of, and claims the benefit of U.S. patent application Ser. No. 15/656,883, filed Jul. 21, 2017, the disclosure of which is hereby expressly incorporated by reference herein in its entirety.

FIELD

The present disclosure is directed to technologies for analyzing data associated with use of a vehicle. In particular, the present disclosure is directed to systems and methods for analyzing device sensor data to detect or estimate whether certain individuals are passengers or operators of vehicles.

BACKGROUND

As mobile electronic devices become more ubiquitous, the amount of data generated by sensors of the electronic device is increasing. For example, most mobile devices include an accelerometer, a location module, a gyroscope, and other sensors. Entities such as companies may collect certain sensor data and use the data for various analyses or applications. For example, a transportation fleet manager may collect location data to manage the locations of vehicles in its fleet.

Entities that issue policies or accounts to individuals may also use certain sensor data to manage the terms of the policies or accounts. For example, an insurance provider may issue vehicle insurance policies to individuals, and may measure the quality of vehicle operation using collected sensor data and process the policies accordingly (e.g., processing "good driver" discounts resulting from safe vehicle operation). However, it is not always the case that an individual, when traveling in a vehicle, is the operator of the vehicle, yet data associated with the vehicle operation may be reflected as if the individual operated the vehicle. These instances result in inaccurate policy processing.

Accordingly, there is an opportunity for data collection and analysis techniques to determine whether individuals are operators or passengers of vehicles.

SUMMARY

In an embodiment, a computer-implemented method of detecting a configuration of a vehicle is provided. The method may include receiving, via a network connection, a set of sensor data from an electronic device associated with an individual, the set of sensor data (i) indicating a set of timestamps corresponding to when the set of sensor data was recorded, and (ii) including at least a set of acceleration data; analyzing, by a computer processor, at least a portion of the set of sensor data using a neural network, the neural network previously trained using a set of training data, including calculating, based on at least the portion of the set of sensor data, at least one probability indicative of whether the individual is an operator or a passenger of the vehicle; and deeming, based on the at least one probability, that the individual is either the operator or the passenger of the vehicle.

In another embodiment, a system for of detecting a configuration of a vehicle is provided. The system may include a communication module configured to communicate with an electronic device associated with an individual via at least one network connection, a memory storing a neural network previously trained using a set of training data, and a set of computer-executable instructions, and a processor interfacing with the communication module and the memory. The processor may be configured to execute the computer-executable instructions to cause the processor to receive, from the electronic device via the communication module, a set of sensor data (i) indicating a set of timestamps corresponding to when the set of sensor data was recorded, and (ii) including at least a set of acceleration data, analyze at least a portion of the set of sensor data using the neural network, the neural network calculating, based on at least the portion of the set of sensor data, at least one probability indicative of whether the individual is an operator or a passenger of the vehicle, and deem, based on the at least one probability, that the individual is either the operator or the passenger of the vehicle.

In another embodiment, a computer-implemented method in an electronic device associated with an individual is provided. The method may include accessing a set of sensor data recorded by a set of sensors incorporated in the electronic device, the set of sensor data including at least a set of acceleration data and a set of location data; determining, by a computer processor based on the set of sensor data, at least a portion of the set of sensor data that is indicative of a set of movements of the electronic device in association with a vehicle; and transmitting at least the portion of the set of sensor data to a server via a network connection, wherein the server analyzes at least the portion of the set of sensor data using a neural network to calculate at least one probability indicative of whether the individual is an operator or a passenger of the vehicle.

DETAILED DESCRIPTION

The present embodiments may relate to, inter alia, collecting and analyzing various combinations of sensor data and other information related to use or operation of a vehicle to determine or estimate whether a designated individual is an operator or a passenger of the vehicle. According to certain aspects, an electronic device may be associated with the designated individual, where the electronic device may be equipped with a set of sensors. The electronic device may collect sensor data associated with or in temporal proximity to use or operation of the vehicle and transmit at least a portion of the sensor data to a backend server that maintains a trained neural network. The backend server uses the neural network to analyze the portion of the sensor data and calculate at least one probability indicative of whether the designated individual is an operator or a passenger of the vehicle.

The systems and methods therefore offer numerous benefits. In particular, the systems and methods facilitate identification and analysis of pertinent sensor data gathered from personal electronic devices using neural networks, which results in efficient and effective data analysis. The neural network may output probabilities that accurately reflect whether individuals are operators or passengers of vehicles. Thus, an entity may process policies or accounts of individuals to more accurately reflect these configurations. Notably, the entity may issue or modify policies or accounts of individuals based on an analysis of sensor data generated by personal electronic devices, thus negating the need to communicate with or install hardware in vehicles. Additionally, individuals may be properly awarded with benefits or incentives that result from vehicle operation that is correctly attributed to them. It should be appreciated that additional benefits are envisioned.

The systems and methods discussed herein address a challenge that is particular to policy or account management. In particular, the challenge relates to a difficulty in effectively and efficiently identifying and analyzing sensor data that is pertinent to the configuration of vehicle operation. Conventionally, entities process an individual's vehicle-related policy using collected data, regardless of whether the individual actually operated the vehicle in the instance that resulted in the collected data. Thus, the individual's vehicle-related policy may be inaccurately processed. The systems and methods offer improved capabilities to solve these problems by identifying portions of sensor data that are pertinent to the individual's role (i.e., operator or passenger) in the vehicle, and analyzing the portions of sensor data using a trained neural network. Further, because the systems and methods employ the capture, analysis, and transmission of data between and among multiple devices, the systems and methods are necessarily rooted in computer technology in order to overcome the noted shortcomings that specifically arise in the realm of policy or account management. Additionally, the systems and methods enable more accurate processing of policies tied specifically to individuals.

The use of one or more neural networks to analyze data is described throughout this specification. However, it should be appreciated that additional or alternative machine learning systems and techniques may be employed. For example, the systems and methods may support decision tree learning, association rule learning, deep learning, inductive logic programming, support vector machines, clustering, Bayesian networks, reinforcement learning, representation learning, similarity and metric learning, sparse dictionary learning, genetic algorithms, rule-based machine learning, learning classifier systems, and/or others.

Figure 1:
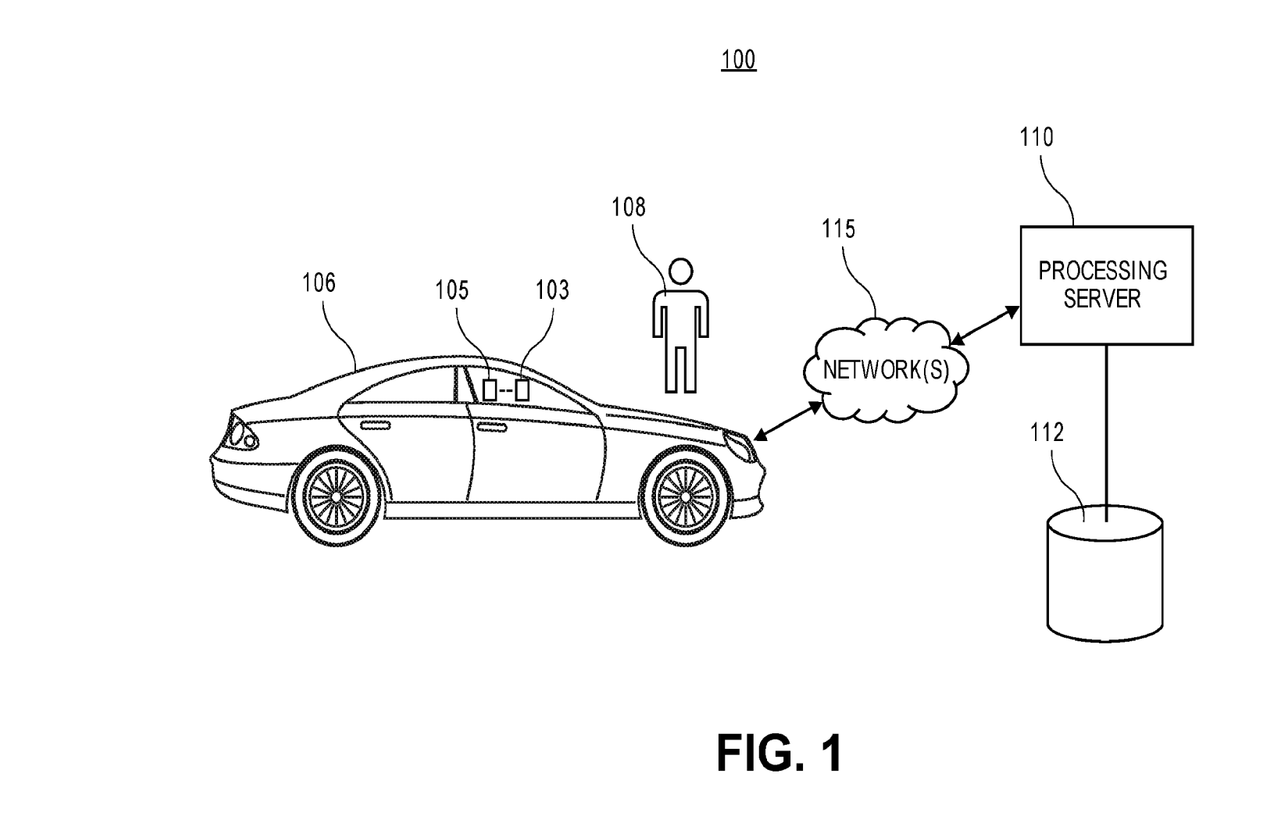
FIG. 1 depicts an overview of components and entities associated with the systems and methods, in accordance with some embodiments.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a vehicle 106 which may be, for example, an automobile, car, truck, motorcycle, motorbike, scooter, boat, recreational vehicle, or any other type of vehicle capable of being operated or driven by an operator. The vehicle 106 may be operated manually by a vehicle operator and/or may operate autonomously by a computer via the collection and analysis of various sensor data. Although FIG. 1 depicts the single vehicle 106, it should be appreciated that additional vehicles are envisioned. The vehicle 106 may include an electronic device 103, which may be an on-board system, device, or component installed within the vehicle 106, an on-board diagnostic (OBD) system or any other type of system configured to be installed in the vehicle 106, such as an original equipment manufacturer (OEM) system.

The system 100 may further include an electronic device 105, which may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like. The electronic device 105 may be equipped or configured with a set of sensors, such as a location module (e.g., a GPS chip), an image sensor, an accelerometer, a clock, a gyroscope, a compass, a yaw rate sensor, a tilt sensor, and/or other sensors.

The electronic device 105 may belong to or be otherwise associated with an individual 108, where the individual 108 may be an owner of the vehicle 106 or otherwise associated with the vehicle 106. For example, the individual 108 may rent the vehicle 106 for a variable or allotted time period, or the individual 108 may operate (or be a passenger of) the vehicle 106 as part of a ride share. Generally, the individual 108 may operate the vehicle 106 (and may thus be an operator of the vehicle), or may be a passenger of the vehicle 106 (e.g., if another individual is driving the vehicle 106 or the vehicle 106 is operating autonomously). According to embodiments, the individual 108 may carry or otherwise have possession of the electronic device 105 during operation of the vehicle 106, regardless of whether the individual 108 is the operator or passenger of the vehicle 106.

The system 100 may further include a processing server 110 connected to or configured to maintain a database 112 capable of storing various data. According to embodiments, the processing server 110 may be associated with an entity such as a company, enterprise, business, individual, or the like, and may issue or maintain policies or accounts for individuals or customers. For example, the processing server 110 may issue a vehicle insurance policy for the individual 108, regardless of which vehicle the individual 108 operates or travels in, where the terms and rates for the vehicle insurance policy may be based on the performance and/or amount of vehicle operation undertaken by the individual 108, and/or on other factors. For example, the vehicle insurance policy may include a "good driver discount" that offers a premium discount for safe driving. As another example, the processing server 110 may issue a vehicle insurance policy that is particular to the vehicle 106, independent of who is operating or traveling in the vehicle 106.

The electronic device 105 may communicate with the processing server 110 via one or more networks 115. In embodiments, the network(s) 115 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

According to embodiments, the processing server 110 may configure or train one or more neural networks, the data of which may be stored in the database 112. Generally, neural networks (sometimes called artificial neural networks (ANNs)) are used in various applications to estimate or approximate functions dependent on a set of inputs. For example, neural networks may be used in speech recognition and to analyze images and video. Generally, neural networks are composed of a set of interconnected processing elements or nodes which process information by its dynamic state response to external inputs. Each neural network may consist of an input layer, one or more hidden layers, and an output layer. The one or more hidden layers are made up of interconnected nodes that process input via a system of weighted connections. Some neural networks are capable of updating by modifying their weights according to their training outputs, while other neural networks are "feedfoward" in which the information does not form a cycle. There are many types of neural networks, where each neural network may be tailored to a different application, such as data analysis, computer vision, speech recognition, image analysis, and others.

According to embodiments, the neural network employed by the systems and methods may analyze sensor data and output a set of probabilities indicative of whether the individual 108 is an operator or a passenger of the vehicle 106. The processing server 110 may initially train the neural network using a set of training data including, as inputs, various types of sensor data. In particular, the set of training data may include location data, acceleration data, timing data, and/or other types of data, and may be sourced from simulated or collected data. The set of training data may also include designated outputs corresponding to the inputs, where the outputs may be percentages or probabilities indicative of whether individuals are operators or passengers of vehicles. Although the embodiments discussed herein describe the neural network data as being stored on the database 112, it should be appreciated that the electronic device 105 may alternatively or additionally store the neural network data. In this regard, the electronic device 105 may locally facilitate analysis of captured sensor data using the neural network(s).

In an implementation, an output of the neural network may include a first probability representative of a given individual being the operator and a second probability representative of the given individual being the passenger. For example, the set of training data may include acceleration data consistent with an individual entering a vehicle from the left side, and an output(s) that includes a first probability of 55% and a second probability of 45%. The set of training data may indicate combinations of the inputs along with respective mappings to the outputs, as understood in the art. It should be appreciated that the processing server 110 may train the neural network according to various conventions or techniques, with varying amounts and sizes of training data. After the processing server 110 trains the neural network, the database 112 may store data associated with the trained neural network.

In operation, the electronic device 105 may receive, collect, request, or otherwise access sensor data from the set of sensors incorporated therein, where the electronic device 105 may access the sensor data before, during, or after operation of the vehicle 106 (i.e., when the engine of the vehicle 106 is on). The electronic device 105 may identify a portion(s) of the sensor data that may be indicative of whether the individual 108 is the operator of a passenger of the vehicle 106.

In an implementation, the electronic device 105 may alternatively or additionally interface with the electronic device 103 and may retrieve sensor data or other information gathered by the electronic device 103. The sensor data retrieved from the electronic device 103 may be vehicle sensor data generated by vehicle sensors such as, for example, a location module (e.g., a global positioning system (GPS) chip), an image sensor, an accelerometer, an ignition sensor, a clock, a speedometer, a torque sensor, a gyroscope, a throttle position sensor, a compass, a yaw rate sensor, a tilt sensor, a steering angle sensor, a brake sensor, and/or other sensors. The retrieved sensor data may supplement the sensor data generated by the sensors of the electronic device 105. According to embodiments, the electronic device 105 may collect its device sensor data continuously, and/or when retrieval of vehicle sensor data is not available.

The electronic device 105 may transmit the sensor data, or portion(s) of the sensor data, to the processing server 110 via the network(s) 115. The processing server 110 may input the sensor data or portion(s) of the sensor data into the neural network, and the neural network may output a probability metric(s) indicative of whether the individual is the operator or a passenger of the vehicle 106. The processing server 110 may process a policy or account of the individual 108 based at least in part on the outputted probability metric(s). Additional details and descriptions of these and other functionalities are described with respect to FIG. 2.

Figure 2:
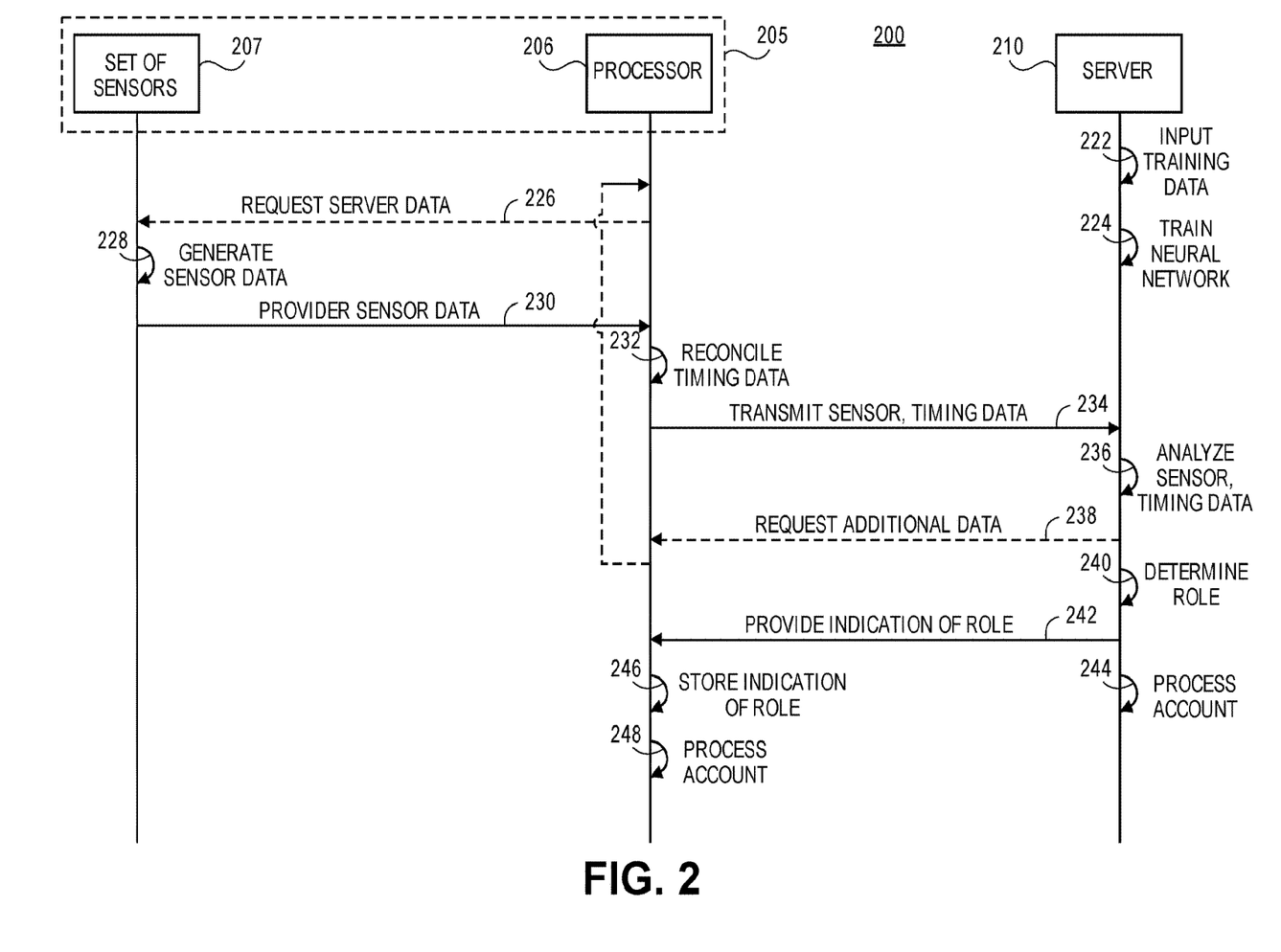
FIG. 2 depicts an example signal diagram associated with collecting and analyzing sensor data associated with use of a vehicle, in accordance with some embodiments.

FIG. 2 depicts a signal diagram 200 associated with collecting and analyzing sensor data associated with use of a vehicle. The signal diagram 200 includes a set of sensors 207 (such as any of the sensors of the electronic device 105 as discussed with respect to FIG. 1), a processor 206, and a server 210 (such as the processing server 110 as discussed with respect to FIG. 1). In an implementation, the set of sensors 207 and the processor 206 may be incorporated into an electronic device 205 (such as the electronic device 105 as discussed with respect to FIG. 1). The server 210 may be located remotely from the processor 206 and the set of sensors 207, where the electronic device 205 may communicate with the server 210 via one or more network connections. The processor 206 may execute a dedicated application configured to facilitate the described functionalities.

The signal diagram 200 may begin when the server 210 receives (222) training data and a set of corresponding training labels as an input. According to embodiments, the training data may include various types of data including acceleration data, location data, timing data, and may generally include simulated data (e.g., gathered in a virtual environment having a physics engine) or real-world data collected from devices. The training data may also include labels (e.g., "passenger" and "driver") to be used in the training. The server 210 may train (224) at least one neural network with the training data and corresponding labels using various backpropagation or other training techniques. In particular, the server 210 may train the at least one neural network by analyzing the inputted data and arriving at outputs(s). By recursively arriving at outputs, comparing the outputs to the training labels, and minimizing the error between the outputs and the training labels, the corresponding neural network(s) may train itself according to the input parameters. According to embodiments, the trained neural network(s) may be configured with a set of corresponding edge weights which enable the trained neural network(s) to analyze new inputted data. The server 210 may locally store, or otherwise be configured to access, the trained neural network(s).

In an optional embodiment, and independent from the neural network training, the processor 206 may request (226) sensor data from the set of sensors 207. According to embodiments, the processor 206 may automatically request the sensor data periodically (e.g., once every ten seconds, once every minute, once every hour), or a user of the electronic device 205 may cause the processor 206 to request the sensor data. Additionally, the processor 206 may request specific sensor data, such as sensor data recorded within a specified timeframe, sensor data of a specific location or area, and/or sensor data according to other parameters.

The set of sensors 207 may generate (228), sense, or otherwise collect a set of sensor data. According to embodiments, the set of sensor data may include at least acceleration data (e.g., measured in g-force) and location data (e.g., GPS coordinates). Additionally or alternatively, the sensor data may indicate connection data representing any connection instances to additional sensors or components associated with the vehicle. For example, the sensor data may indicate that the electronic device 205 paired to the vehicle via a personal area network (PAN) connection.

In embodiments, the set of sensors 207 may generate the set of sensor data continuously, over a specified period of time, and/or in accordance with any request received from the processor 206. The set of sensors 207 may provide (230) the set of sensor data to the processor 206. In embodiments, the set of sensors 207 may provide the set of sensor data continuously as the sensor data is generated, or at a specified time(s).

The processor 206 may reconcile (232) clock or timing data that may be generated by a clock or other timing mechanism of the electronic device 205. In embodiments, the set of sensor data may include timestamps corresponding to when the respective readings in the set of sensor data were recorded. For example, a certain accelerometer reading and a certain location reading may each include a corresponding timestamp. In an implementation, the processor 206 may associate the set of sensor data with a timestamp generated by a clock upon the processor 206 receiving the set of sensor data from the set of sensors 207.

According to embodiments, the processor 206 may identify a portion(s) of the data that may be relevant to use of the vehicle. In a particular instance, the processor 206 may determine that the location data indicates that the electronic device 205 is located in proximity to a designated vehicle location (e.g., a garage, a driveway, etc.), and may identify a portion of the sensor data that corresponds to the respective location data (e.g., acceleration data recorded at or near the time that the location data was recorded). In another instance, the processor 206 may determine from the set of sensor data that the electronic device 205 is traveling above a threshold speed, which may indicate that the electronic device 205 is located within a vehicle, and may identify a portion of the set of sensor data that has a temporal proximity (e.g., before, during, and/or after) to the assessed sensor data.

In a further instance, the processor 206 may identify a portion of the set of sensor data that is recorded before, during, or after the electronic device 205 connects to a device associated with the vehicle. For example, the electronic device 205 may pair with (or disconnect from) the vehicle or may detect that the vehicle is started (or stopped), in which case a relevant portion of the set of sensor data (e.g., location data, accelerometer readings, etc.) may be the sensor data having temporal proximity to the electronic device 205 pairing with (or disconnecting from) the vehicle or detecting the vehicle is started (or stopped). It should be appreciated that the processor 206 may identify, in the sensor data, additional instances that may be representative of usage or operation of the vehicle.

The processor 206 may cause (234) the set of sensor data and the timing data to be transmitted to the server 210 via one or more network connections. In particular, the processor 206 may cause any identified relevant portions of the set of sensor data and the corresponding timing data to be transmitted to the server 210. It should be appreciated that the processor 206 may transmit the data continuously as the processor 206 receives and/or analyzes the data, periodically (e.g., once every ten seconds, minute, hour, etc.), or in response to a certain trigger (e.g., a connection being established between the electronic device 205 and the server 210, a request from a user of the electronic device 205, etc.). It should further be appreciated that the processor 206 may transmit the sensor data to the server 210, at which point the server 210 may alternatively or additionally examine the sensor data and the timing data to identify relevant portions of the data, as discussed above.

After receiving the data, the server 210 may analyze (236) the sensor and timing data using the neural network that was trained in (224). In operation, the server 210 may input a portion of the sensor and timing data into the neural network, where the neural network may provide an associated output(s) that may represent a probability(ies) (e.g., on a scale of 0%-100%, or other ranges) of whether the individual associated with the received data is a passenger of the vehicle or an operator of the vehicle. In an embodiment, the server 210 may at a minimum consider acceleration data and location data. However, it should be appreciated that the server 210 may analyze any combination of data types as input(s).

In an example use case, the inputted data may include acceleration data recorded in proximity to an individual entering or exiting a vehicle, where the acceleration data may be indicative of whether the individual entered or exited the vehicle from the right side or the left side of the vehicle. If the individual entered or exited the vehicle from the right side, then there is virtual certainty that the individual is not the operator of the vehicle, and if the individual entered or exited the vehicle from the left side, then there is about a 50% chance (or greater) that the individual is the operator of the vehicle. Accordingly, the neural network may receive the acceleration data as an input, and may output a probability that the individual entered from the right side, a probability that the individual entered from the left side, and a probability of whether the individual is the operator or the passenger.

Additionally or alternatively, the timing data may indicate the time between an individual entering a vehicle and the vehicle being started or starting movement, where a shorter time may increase the probability that the individual is a passenger. Similarly, the timing data may indicate the time between the vehicle being stopped or stopping movement and the individual exiting the vehicle, where a shorter time may increase the probability that the individual is a passenger. This may be especially evident in situations in which the individual is a passenger in a ride share vehicle, as the individual often enters (or exits) the vehicle immediately before (or after) the vehicle departs from (or arrives at) its origin (or destination). The neural network may account for this relevant timing data, and the output(s) may reflect as such.

In another example use case, the location data may indicate a known or designated location for a vehicle, such as a garage, driveway, or other location where the vehicle may commonly be located. When the location data indicates such a known or designated location, the probability that the individual is the operator of the vehicle increases, which may be reflected in the output of the neural network.

In a further example use case, the set of sensor data may indicate movement of the vehicle that is indicative of vehicle ownership, and therefore that the probability that the individual is the operator of the vehicle may be increased. For example, the acceleration data and/or location data may indicate instances of the vehicle traveling in reverse (e.g., indicative of backing out of a driveway) and/or instances of the vehicle backing up and moving forward (e.g., indicative of backing out of a parking spot). The neural network may account for this relevant data, and the output(s) may reflect as such.

In an additional example use case, the set of sensor data may indicate movement of the electronic device 205 before, during, or after use of the vehicle. In particular, the set of sensor data may include instances of use of the electronic device 205 during operation of the vehicle, which may increase the probability that the individual is a passenger of the vehicle. Further, the set of sensor data may indicate the electronic device's 205 placement into or retrieval from a stable location, such as a mount, a cup holder, or other place which may secure the electronic device 205 during operation of the vehicle, which may increase the probability that the individual is the operator of the vehicle. In contrast, the set of sensor data may indicate continued manual handling of the electronic device 205, which may increase the probability that the individual is a passenger of the vehicle, as passengers tend to physically hold electronic devices. The neural network may account for this relevant data, as well as for timing data associated therewith, and the output(s) may reflect as such.

In analyzing the sensor and timing data, the server 210 may determine that additional data is needed to assess the configuration of the vehicle. In this instance, the server 210 may optionally request (238) additional data from the electronic device 205, in which case the electronic device 205 and the set of sensors 207 may repeat (226) (228), (230), (232), and/or (234), either according to the request or operating normally.

Based on the analysis of the data, the server 210 may determine (240) the role or configuration of the user in association with the vehicle (i.e., whether the individual is likely to be the passenger or the operator of the vehicle). As described herein, the neural network may output one or more probabilities that may indicate a likelihood(s) of whether the individual is a passenger or an operator.

In embodiments, the neural network may include a set of layers that may not be fully connected. The neural network may be trained to meaningfully group together raw signal data (e.g., could be used to predict which side of the vehicle an individual exits from), where the units of the neural network may be connected in one of the hidden layers. An advantage of this configuration is that the final error of the prediction may be back-propagate through the network, which may result in improved accuracy in role determinations.

In an implementation, the output(s) of the neural network may be probability(ies) or percentage(s) associated with a certain feature(s) or scenario(s) indicative of roles of individuals. The output(s) may be representative of a softmax or normalized exponential function comprising a K-dimensional vector of real values in the range (0,1] that add up to one (1). In operation, a softmax function may receive, as inputs, a first initial probability representative of a first feature and a second initial probability representative of a second feature. The softmax function may output a first final probability representative of the first feature and a second final probability representative of the second feature. In an alternative implementation, the neural network may include an affine layer (i.e., a fully connected layer) that may take, as inputs, values from hidden units and matrix multiply the values by learned weights, where a sigmoid function may process the output(s) therefrom. In operation, the affine layer may receive, as inputs, a first probability representative of a first feature and a second probability representative of a second feature, where an output(s) of the affine layer may be processed by the sigmoid function.

It should be appreciated that the server 210 may consider combinations of the probability(ies) as well as weightings for the probability(ies). In embodiments, the server 210 may also determine metrics associated with the operation of the vehicle, such as speed, location, driving events (e.g., hard braking, sudden acceleration, etc.), distance traveled, operation time, and/or other data.

After determining the role or configuration, the server 210 may provide (242) an indication of the determined role or configuration to the electronic device 205. The processor 206 may cause (246) the indication of the determined role or configuration to be stored. Accordingly, the electronic device 205 or the application executing thereon may maintain a record or log of instances when the individual is determined to be an operator or passenger of a vehicle. In embodiments, the electronic device 205 may also be configured to display any metrics associated with operation of the vehicle.

The server 210 may process (244) an account of the individual based on the role or configuration determined in (240), any previously-determined roles or configurations, as well as on any determined metrics associated with operation of the vehicle. In particular, the server 210 may adjust certain terms, conditions, or rates of policies or accounts for the individual. For example, if the server 210 determines that the quality of operation of a vehicle is above average for the last five (5) times an individual operated the vehicle, then the server 210 may reduce a premium amount of a vehicle insurance policy for the individual. Additionally or alternatively, the processor 206 may similarly process (248) the account of the individual. It should be appreciated that the server 210 (or the processor 206) may process the account or policy in any manner according to any analysis of sensor data.

Figure 3A:
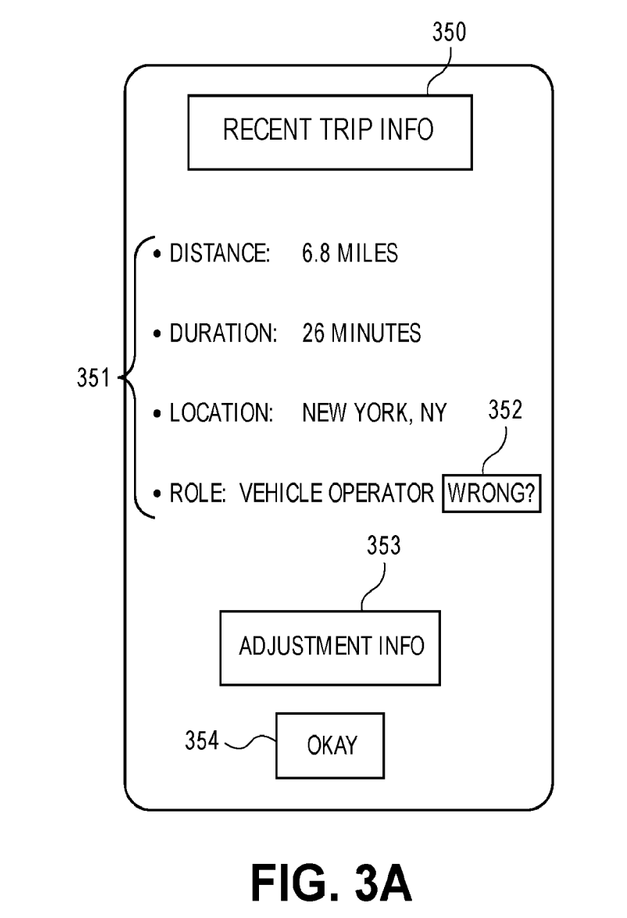
FIGS. 3A and 3B depict example user interfaces associated with processing an account or policy of an individual, in accordance with some embodiments.
Figure 3B:
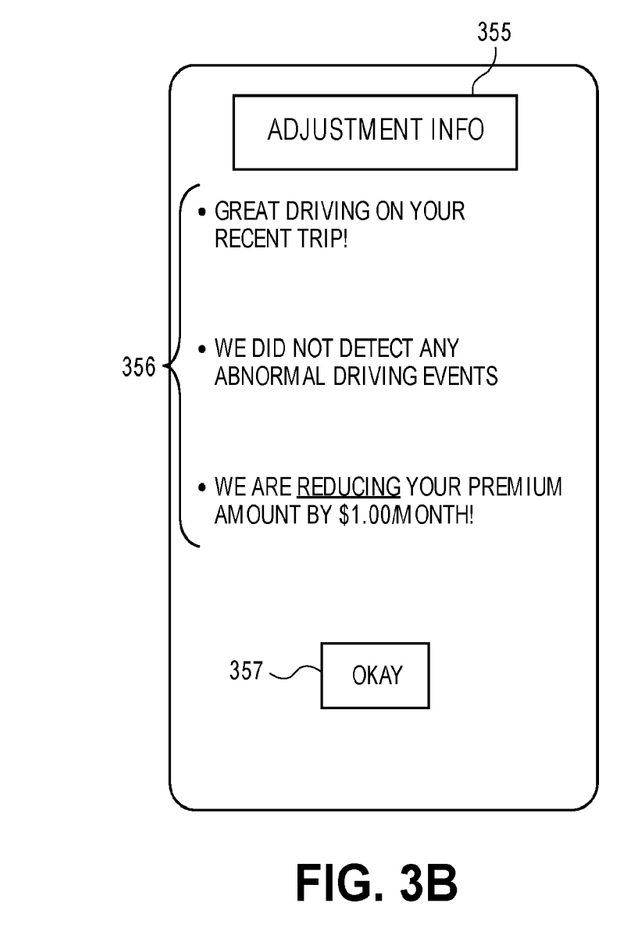

FIGS. 3A and 3B illustrate example interfaces associated with the systems and methods. An electronic device, such as the electronic device 205 as discussed with respect to FIG. 2, may be configured to display the interfaces and/or receive selections and inputs via the interfaces. One or more dedicated applications that are configured to operate on the electronic device may display the interfaces, where an individual may have an account or policy that may be accessed by the application(s).

The electronic device may receive the content included in the interfaces from a server, such as the server 210 as discussed with respect to FIG. 2. Additionally or alternatively, the electronic device may locally determine the content included in the interfaces, such as using sensor data collected during operation of a vehicle. It should be appreciated that the interfaces are merely examples and that alternative or additional content is envisioned.

FIG. 3A illustrates an interface 350 depicting information associated with a recent vehicular operation, or trip, undertaken by the individual. The interface 350 includes a set of information 351 associated with the trip (as shown: a distance, duration, location, and role). The set of information 351 indicates that the individual was deemed the vehicle operator for the trip, such as via a neural network analysis of sensor data associated with the trip. The interface 350 may include a correction selection 352 that enables the individual to correct the role determination. For example, if the individual was actually a passenger in the vehicle on the trip, the individual may select the correction selection 352 to request an appropriate entity to correct the role designation. In embodiments, the server may store the correction along with the underlying sensor data, and may additionally train or update any associated neural network(s) using the correction and any additional corrections, such that the server may use the retrained neural network in subsequent analyses.

The interface 350 may further include an information selection 353 that, upon selection, causes the electronic device to display information associated with an adjustment of a policy or account of the individual. Additionally, the interface may include an okay selection 354 that, upon selection, may cause the electronic device to dismiss the interface 350 and proceed to other functionality.

FIG. 3B illustrates an interface 355 depicting information associated with an adjustment of a policy or account of the individual. In embodiments, the electronic device may display the interface 355 in response to the individual selecting the information selection 353 of the interface 350 of FIG. 3A. The interface 335 includes a set of information 356 related to the recent trip as well as adjustments made to the policy or account of the individual. As shown in FIG. 3B, the set of information 356 indicates that the trip did not have any detected abnormal driving events, and that the premium amount of the policy is being reduced by $1.00/month. The interface 355 includes an okay selection 357 that, upon selection, may cause the electronic device to dismiss the interface 355 and proceed to other functionality.

Figure 4:
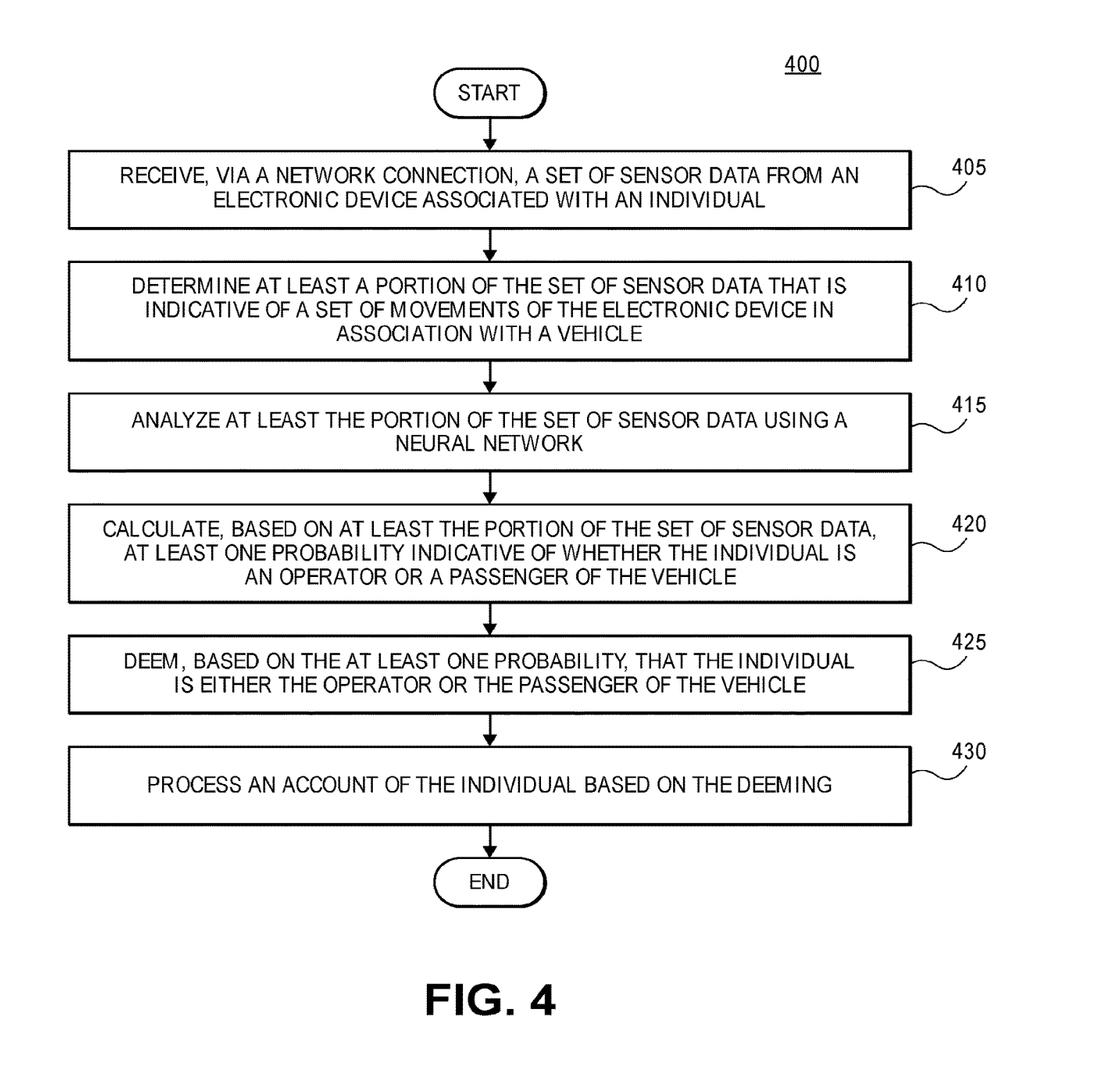
FIG. 4 depicts an example flow diagram associated with detecting a configuration of a vehicle, in accordance with some embodiments.

FIG. 4 depicts is a block diagram of an example method 400 of detecting a configuration of a vehicle. The method 400 may be facilitated by a server (such as the server 210 as discussed with respect to FIG. 2) that may communicate with one or more electronic devices or components. It should be appreciated that the server may manage or access a neural network previously trained with a set of training data.

The method 400 may begin when the server receives (block 405), via a network connection, a set of sensor data from an electronic device associated with an individual. The set of sensor data may indicate a set of timestamps corresponding to when the set of sensor data was recorded, and include at least a set of acceleration data, however it should be appreciated that the set of sensor data may include alternative or additional types of data.

The server may determine (block 410) at least a portion of the set of sensor data that is indicative of a set of movements of the electronic device in association with a vehicle. In embodiments in which the set of sensor data includes a set of location data, the server may determine, from at least a portion of the set of location data, that the electronic device is located in proximity to a designated vehicle location, and identify at least a portion of the set of acceleration data that corresponds to at least the portion of the set of location data. Additionally or alternatively, the server may detect, from the set of sensor data, an instance of the electronic device connecting to the vehicle, and identify at least a portion of the set of acceleration data that is in temporal proximity to the instance of the electronic device connecting to the vehicle.

The server may analyze (block 415) at least the portion of the set of sensor data using a neural network. In particular, the server may input, into the neural network, at least the portion of the set of sensor data. The server may calculate (block 420), based on at least the portion of the set of sensor data, at least one probability indicative of whether the individual is an operator or a passenger of the vehicle. In embodiments, the neural network may output, based on at least the portion of the set of sensor data, (i) a first probability representative of the individual being the operator, and (ii) a second probability representative of the individual being the passenger.

The server may deem (block 425), based on the at least one probability, that the individual is either the operator or the passenger of the vehicle. In embodiments, the at least one probability may be associated with a certain feature or scenario, where the server may process the at least one probability using a softmax function, an affine layer, and/or a sigmoid function, as discussed herein. The server may also compare the at least one probability to a respective threshold value(s). The server may process (block 430) an account of the individual based on the deeming. In particular, the server may modify any terms or conditions of the account based on whether the individual is deemed the operator or passenger of the vehicle.

Figure 5:
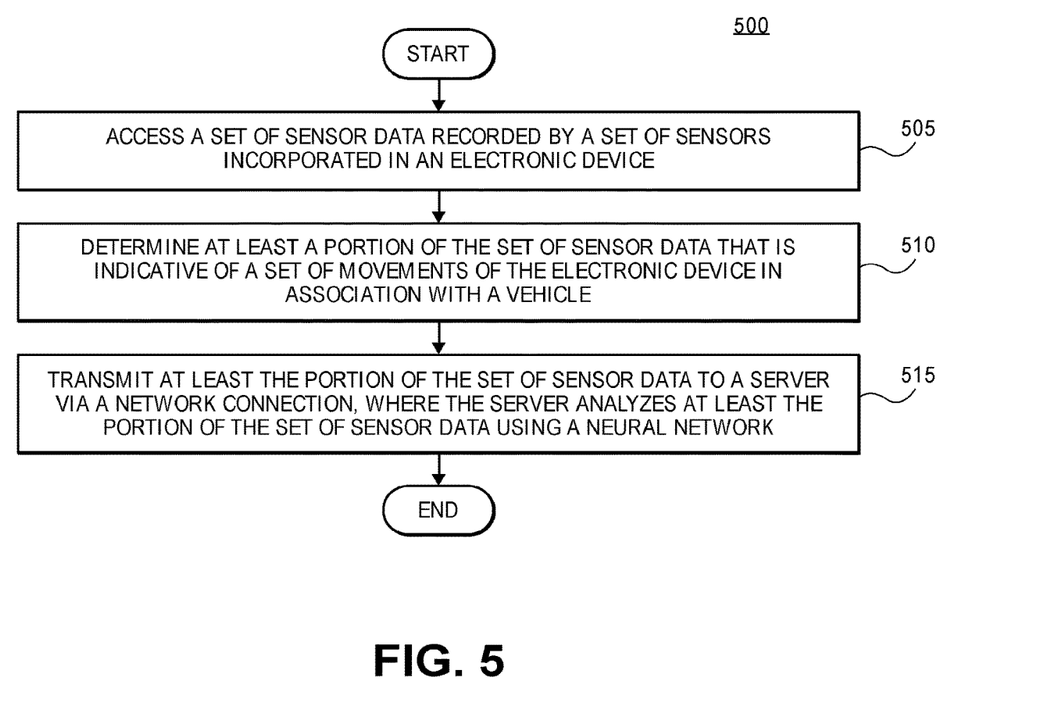
FIG. 5 depicts another example flow diagram associated with detecting a configuration of a vehicle, in accordance with some embodiments.

FIG. 5 depicts is a block diagram of an example method 500 of detecting a configuration of a vehicle. The method 500 may be facilitated by an electronic device (such as the electronic device 205 as discussed with respect to FIG. 2) that may communicate with one or more sensors, electronic devices, servers, or components.

The method 500 may begin when the electronic device accesses (block 505) a set of sensor data recorded by a set of sensors incorporated in the electronic device. In embodiments, the set of sensor data may include at least a set of acceleration data and a set of location data.

The electronic device may determine (block 510), based on the set of sensor data, at least a portion of the set of sensor data that is indicative of a set of movements of the electronic device in association with a vehicle. In an embodiment, the electronic device may determine, based on the set of acceleration data and the set of location data, at least the portion of the set of sensor data that is indicative of movement of the vehicle itself. Additionally or alternatively, the electronic device may determine, from at least a portion of the set of location data, that the electronic device is located in proximity to a designated vehicle location, and may identify at least a portion of the set of acceleration data that corresponds to at least the portion of the set of location data. Additionally or alternatively, the electronic device may detect, from the set of sensor data, an instance of the electronic device connecting to the vehicle, and may identify at least a portion of the set of acceleration data that is in temporal proximity to the instance of the electronic device connecting to the vehicle.

The electronic device may transmit (block 515) at least the portion of the set of sensor data to a server via a network connection, where the server may analyze at least the portion of the set of sensor data using a neural network. In particular, the neural network may receive at least the portion of the set of sensor data as inputs, and may output at least one probability indicative of whether the individual is an operator or a passenger of the vehicle.

Figure 6:
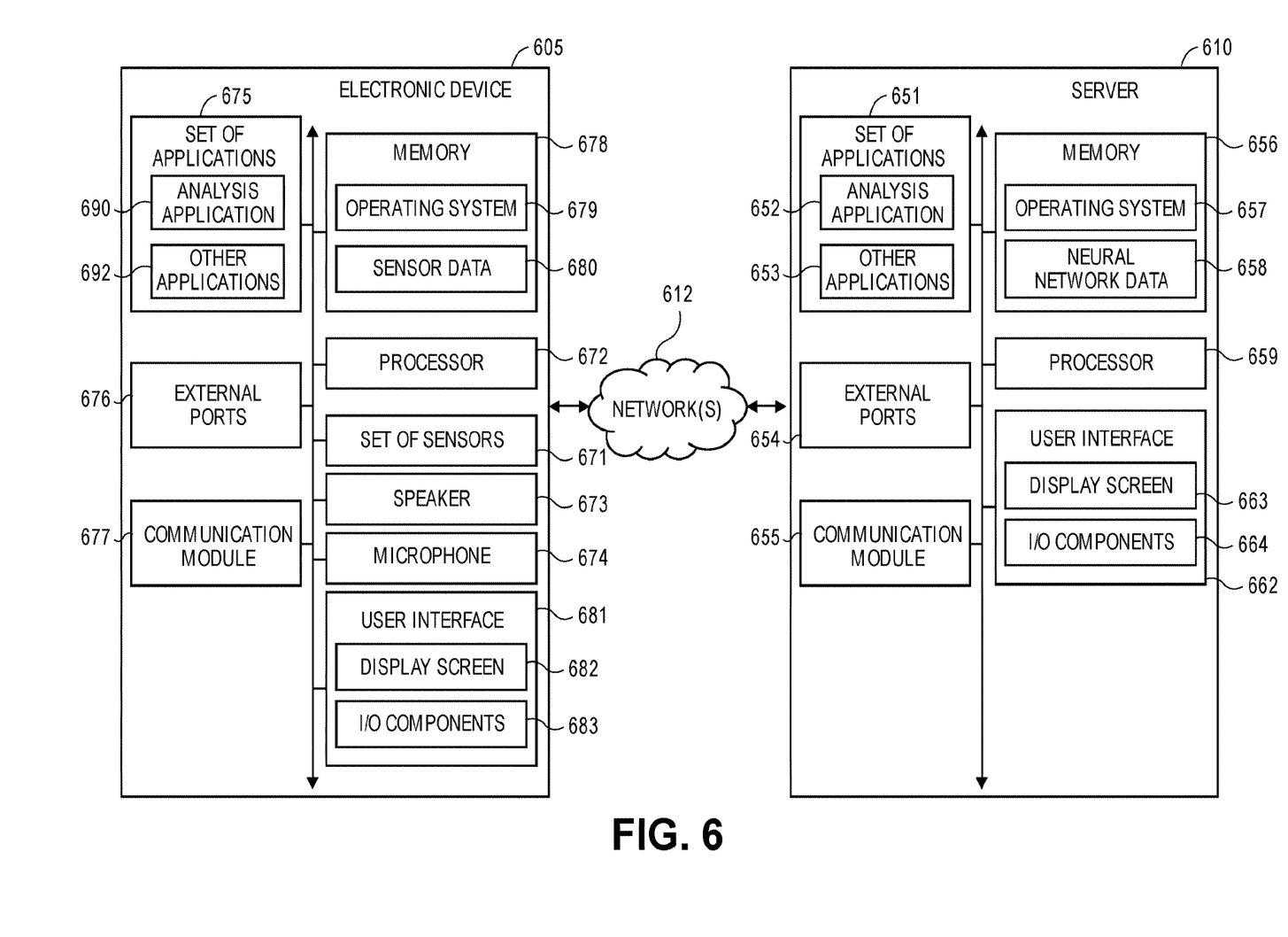
FIG. 6 is a hardware diagram of an example electronic device and an example server, in accordance with some embodiments.

FIG. 6 illustrates a hardware diagram of an example electronic device 605 (such as the electronic device 205 as discussed with respect to FIG. 2) and an example server 610 (such as the server 210 as discussed with respect to FIG. 2), in which the functionalities as discussed herein may be implemented. It should be appreciated that the server 610 may be associated with an entity that may issue and manage policies or accounts of individuals.

The electronic device 605 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be an analysis application 690 configured to analyze sensor data and/or other information. It should be appreciated that one or more other applications 692 are envisioned, such as an application associated with accessing a policy or account of an individual.

The processor 672 may interface with the memory 678 to execute the operating system 679 and the set of applications 675. According to some embodiments, the memory 678 may also include sensor data 680 including data accessed or collected from a set of sensors. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 605 may further include a communication module 677 configured to communicate data via one or more networks 612. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. For example, the communication module 677 may interface with another device, component, or sensors via the network(s) 612 to retrieve sensor data.

The electronic device 605 may include a set of sensors 671 such as, for example, a location module (e.g., a GPS chip), an image sensor, an accelerometer, a clock, a gyroscope, a compass, a yaw rate sensor, a tilt sensor, and/or other sensors. The electronic device 605 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs). According to some embodiments, the user may access the electronic device 605 via the user interface 681 to review information, make selections, and/or perform other functions. Additionally, the electronic device 605 may include a speaker 673 configured to output audio data and a microphone 674 configured to detect audio.

In some embodiments, the electronic device 605 may perform the functionalities as discussed herein as part of a "cloud" network or may otherwise communicate with other hardware or software components within the cloud to send, retrieve, or otherwise analyze data.

As illustrated in FIG. 6, the electronic device 605 may communicate and interface with the server 610 via the network(s) 612. The server 610 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be an analysis application 652 configured to analyze data using a set of neural networks. It should be appreciated that one or more other applications 653 are envisioned.

The processor 659 may interface with the memory 656 to execute the operating system 657 and the set of applications 651. According to some embodiments, the memory 656 may also include neural network data 658, such as set(s) of training data and/or data associated with a trained neural network(s). The memory 656 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 610 may further include a communication module 655 configured to communicate data via the one or more networks 612. According to some embodiments, the communication module 655 may include one or more transceivers (e.g., WWAN, WLAN, and/or WPAN transceivers) functioning in accordance with IEEE standards, 3GPP standards, or other standards, and configured to receive and transmit data via one or more external ports 654. For example, the communication module 655 may receive, from the electronic device 605, a set(s) of sensor data.

The server 610 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs). According to some embodiments, the user may access the server 610 via the user interface 662 to review information, make changes, input training data, and/or perform other functions.

In some embodiments, the server 610 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A method implemented by one or more processors for determining a role of an individual associated with a vehicle, the method comprising:
    receiving, by the one or more processors, a set of sensor data associated with an electronic device of the individual, the set of sensor data corresponding to a first set of timing data;
    receiving, by the one or more processors, a set of location data corresponding to a second set of timing data;
    determining, by the one or more processors, a time of interest that corresponds to when the electronic device is located in proximity to a designated vehicle location based upon the set of location data;
    identifying, by the one or more processors, a first portion of the set of sensor data corresponding to the time of interest;
    inputting, by the one or more processors, the first portion of the set of sensor data into a trained neural network; and
    determining, by the one or more processors using the trained neural network, a probability of the individual being an operator of the vehicle based at least in part upon the first portion of the set of sensor data.

2. The method of claim 1, further comprising:
    determining, by the one or more processors, that the individual is either the operator or a passenger of the vehicle based upon the probability.

3. The method of claim 2, further comprising:
    processing, by the one or more processors, an account of the individual based upon determining that the individual is either the operator or the passenger of the vehicle.

4. The method of claim 1, wherein the determining, by the one or more processors using the trained neural network, the probability comprises:
    inputting a first initial probability representative of a first feature and a second initial probability representative of a second feature into a softmax function,
    wherein an output of the softmax function includes a first final probability representative of the first feature and a second final probability representative of the second feature.

5. The method of claim 1, wherein the determining, by the one or more processors using the trained neural network, the probability comprises:
    inputting a first probability representative of a first feature and a second probability representative of a second feature into an affine layer of the trained neural network; and
    processing an output of the affine layer by a sigmoid function.

6. The method of claim 1, further comprising:
    identifying, by the one or more processors, a second portion of the set of sensor data that is indicative of a set of movements of the electronic device in association with the vehicle; and
    determining, by the one or more processors using the trained neural network, the probability based at least in part upon the second portion of the set of sensor data.

7. The method of claim 1, further comprising:
    detecting an instance of the electronic device connecting to the vehicle based upon the set of sensor data; and
    identifying a third portion of the set of sensor data that is in temporal proximity to the instance of the electronic device connecting to the vehicle.

8. The method of claim 7, further comprising:
    determining, by the one or more processors using the trained neural network, the probability based at least in part upon the third portion of the set of sensor data.

9. A computing system for determining a role of an individual associated with a vehicle, the computing system comprising:
    a processor; and
    a memory storing computer-executable instructions, that when executed by the processor, cause the processor to perform operations comprising:
        receiving a set of sensor data associated with an electronic device of the individual, the set of sensor data corresponding to a first set of timing data;
        receiving a set of location data corresponding to a second set of timing data;
        determining a time of interest that corresponds to when the electronic device is located in proximity to a designated vehicle location based upon the set of location data;
        identifying a first portion of the set of sensor data corresponding to the time of interest;
        inputting the first portion of the set of sensor data into a trained neural network; and
        determining, using the trained neural network, a first probability of the individual being an operator of the vehicle based at least in part upon the first portion of the set of sensor data.

10. The computing system of claim 9, wherein the operations further comprise:
    determining that the individual is either the operator or a passenger of the vehicle based upon the first probability.

11. The computing system of claim 10, wherein the operations further comprise:
processing an account of the individual based upon determining that the individual is either the operator or the passenger of the vehicle.

12. The computing system of claim 10, wherein the operations further comprise:
determining a second probability of the individual being the passenger of the vehicle.

13. The computing system of claim 12, wherein the operations further comprise:
comparing the first probability and the second probability with a threshold value to generate a comparison result; and
determining that the individual is either the operator or the passenger of the vehicle based at least in part upon the comparison result.

14. The computing system of claim 9, wherein the operations further comprise:
identifying a second portion of the set of sensor data that is indicative of a set of movements of the electronic device in association with the vehicle; and
determining, using the trained neural network, the first probability based at least in part upon the second portion of the set of sensor data.

15. The computing system of claim 9, wherein the operations further comprise:
detecting an instance of the electronic device connecting to the vehicle based upon the set of sensor data; and
identifying a third portion of the set of sensor data that is in temporal proximity to the instance of the electronic device connecting to the vehicle.

16. The computing system of claim 9, wherein the operations further comprise:
determining, using the trained neural network, the first probability based at least in part upon the third portion of the set of sensor data.

17. A non-transitory computer-readable storage medium having stored thereon a set of instructions, executable by a processor, for determining a role of an individual associated with a vehicle, the set of instructions comprising instructions for:
receiving a set of sensor data associated with an electronic device of the individual, the set of sensor data corresponding to a first set of timing data;
receiving a set of location data corresponding to a second set of timing data;
determining a time of interest that corresponds to when the electronic device is located in proximity to a designated vehicle location based upon the set of location data;
identifying a first portion of the set of sensor data corresponding to the time of interest;
inputting the first portion of the set of sensor data into a trained neural network; and
determining, by the one or more processors using the trained neural network, a probability of the individual being an operator of the vehicle based at least in part upon the first portion of the set of sensor data.

18. The non-transitory computer-readable storage medium of claim 17, wherein the set of instructions further comprise:
inputting a first initial probability representative of a first feature and a second initial probability representative of a second feature into a softmax function,
wherein an output of the softmax function includes a first final probability representative of the first feature and a second final probability representative of the second feature.

19. The non-transitory computer-readable storage medium of claim 17, wherein the set of instructions further comprise:
inputting a first probability representative of a first feature and a second probability representative of a second feature into an affine layer of the trained neural network; and
processing an output of the affine layer by a sigmoid function.

20. The non-transitory computer-readable storage medium of claim 17, further comprising:
determining a second portion of the set of sensor data that is indicative of a set of movements of the electronic device in association with the vehicle; and
determining, using the trained neural network, the probability based at least in part upon the second portion of the set of sensor data.

* * * * *